United States Patent [19]

Lutz et al.

[11] Patent Number: 5,036,114
[45] Date of Patent: Jul. 30, 1991

[54] ACRYLAMIDE POLYSILOXANE COMPOSITION WITH IMPROVED HEAT STABILITY

[75] Inventors: Michael A. Lutz, Midland; Kristen A. Scheibert, Sanford, both of Mich.

[73] Assignee: Dow Corning Corporation, Midland, Mich.

[21] Appl. No.: 335,639

[22] Filed: Apr. 10, 1989

[51] Int. Cl.$^5$ .................... C08G 77/04; C08G 77/06
[52] U.S. Cl. ........................ 522/20; 522/99; 528/17; 528/18; 528/19; 528/32
[58] Field of Search .................. 528/17, 18, 19, 32, 528/33; 522/99, 20

[56] References Cited

U.S. PATENT DOCUMENTS

| | | | |
|---|---|---|---|
| 2,929,829 | 3/1960 | Morehouse | 260/448.2 |
| 4,322,517 | 3/1982 | Deubzer et al. | 528/32 |
| 4,507,384 | 3/1985 | Morita et al. | 430/311 |
| 4,608,270 | 8/1986 | Varaprath | 427/35 |
| 4,735,971 | 4/1988 | Inoue et al. | 528/32 |
| 4,824,875 | 4/1989 | Gutek | 522/99 |
| 4,831,064 | 5/1989 | Varaprath et al. | 522/99 |

*Primary Examiner*—Marion E. McCamish
*Assistant Examiner*—Susan Berman
*Attorney, Agent, or Firm*—Roger H. Borrousch

[57] ABSTRACT

The heat stability of acrylamide functional polyorganosiloxane which cure by exposure to ultraviolet radiation can be improved by the addition of zinc naphthenate, stannous octoate, and organotitanates.

38 Claims, No Drawings

ACRYLAMIDE POLYSILOXANE COMPOSITION WITH IMPROVED HEAT STABILITY

BACKGROUND OF THE INVENTION

1. Field of the Invention

This invention relates to improving the heat stability of acrylamide functional polyorganosiloxanes.

2. Background Information

Polyorganosiloxane are known to have valuable properties for protecting surfaces from environmental attack such as from weather, chemical, cold, and heat. However, each of these have limitations and improvement is still sought, so that, the materials can be used in harsher environments than was previously possible. Polyorganosiloxanes provide electrical insulating properties which make them useful in the electronics industry for coatings, encapsulants, and potting materials. For example, a printed circuit board may find utility in an engine of an automobile or other vehicle, but the temperatures may be too high for prolonged exposure and the polyorganosiloxane materials may not maintain their functional properties adequately. However, if one can increase the serviceable temperature of the polyorganosiloxane material, maybe a coated printed circuit board might be useful for applications where it will be exposed to high temperatures. The polyorganosiloxane should maintain sufficient physical integrity to protect the device it is covering and also it should not release degradation products which may harm delicate instrumentation.

The use of polyorganosiloxane materials which will cure by exposure to ultraviolet radiation provide the advantages of fast curing, low amounts of volatiles given off during curing, readily applicable to automation, cure at low temperatures and reduced energy costs. These are some of the reasons for today's industry wanting to use both polyorganosiloxanes and the ultraviolet radiation curing combination. However, many of the polyorganosiloxane compositions which may be cured by exposure to ultraviolet radiation have relatively low tolerance to prolonged exposure to high temperatures without degrading or loosing their physical properties. To make them more desirable for applications protecting surfaces from environments during and after exposure to high temperatures, the heat or thermal stability needs to be improved. Therefore, a search was conducted to find a means for increasing the serviceable temperature of ultraviolet radiation curable polyorganosiloxane compositions. The means should overcome the effects of exposure to high temperature, such as loss of mechanical strength and toughness, embrittlement and cracking, and reduction in electrical properties.

SUMMARY OF THE INVENTION

This invention relates to acrylamide functional polyorganosiloxane curable by exposure to ultraviolet radiation and having improved thermal stability.

This invention relates to a composition comprising a polyorganosiloxane having on the average more than about 0.4 acrylamide functional groups per molecule and being crosslinkable by exposure to ultraviolet radiation in the presence of a photosensitization system, an effective amount of a heat stability additive selected from the group consisting of zinc naphthenate, stannous octoate, and tetraorganotitanate, and an effective amount of a photosensitization system.

DETAILED DESCRIPTION OF THE PREFERRED EMBODIMENTS

Polyorganosiloxanes which contain the acrylamide functionality useful in the compositions of this invention can be those which are known in the art. They can contain any combination of siloxane units and therefore the structure will vary widely and include linear, branched, three dimensional network, cyclic, and the like. The siloxane units can be monoorganosilsequioxane, diorganosiloxane, triorganosiloxy, and $SiO_2$. The acrylamide functionality can be on any of the organic group-containing siloxane units, however, the preferred polyorganosiloxanes are the linear polydiorganosiloxanes which are essentially composed of diorganosiloxane units.

The heat stability additives useful for the acrylamide functional polyorganosiloxanes of this invention are zinc naphthenate, stannous octoate, and organotitanate. These heat stability additives are used in amounts which provide effective property stabilization during exposure to high temperatures over prolonged periods of time. One property which reflects the stability of a cured material during exposure to high temperatures is the hardness, such as provided by the durometer values. A material which significantly increases or decreases in hardness over the heating period reflects product instability. Because degradation can cause the number of crosslinks per unit to increase which increases the hardness, one illustration of heat stability would be that the hardness does not substantially increase during the heating period, such as an increase of less than 20%. Because degradation can cause the number of crosslinks per unit to decrease which decreases the hardness, another illustration of heat stability would be that the hardness does not substantially decrease over the heating period, such as a decrease of less than 20%. Preferably, the effective amount of heat stability additive is the amount which provides the cured acrylamide functional polyorganosiloxane composition to maintain its durometer value within plus or minus 20% of the initial cured durometer, more preferably, within plus or minus 15% of the initial cured durometer. The preferred effective amounts are such that the weight percentages of the heat stability additive are within the range of from 0.005 to 5 weight percent based on the weight of composition. The most preferred amounts of heat stability additive are from 0.5 to 2 weight percent for zinc naphthenate and stannous octoate, and from 0.7 to 1.5 weight percent for organotitanate. The preferred organotitanate is tetrabutyl titanate. A number of compounds were evaluated as heat stability additives but were found to be substantially ineffective or were detrimental to the heat stability of the acrylamide functional polyorganosiloxane compositions of this invention. These ineffective compounds were cobalt naphthenate, copper naphthenate, ferric naphthenate, manganese octoate, cobalt octoate, ferric octoate, bis(ethyl-3-oxobutanolato-1,3-)bis(2-propanolato) titanium, and a chloroplatinic acid complex with tetramethyldivinyldisiloxane.

The heat stability additive is physically blended with the other ingredients to form homogeneous mixtures. The heat stability additive is most effective when it is well dispersed throughout the composition. In some circumstances, the dispersion of the heat stability additive can be assisted by mild heating during the mixing operations. Solvents might be used to aid in dispersion of the heat stability additive.

The acrylamide functionality is bonded to silicon atoms of the polyorganosiloxane molecules through silicon-carbon bonds and has a formula

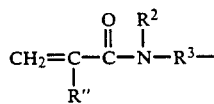    Formula I or the formula

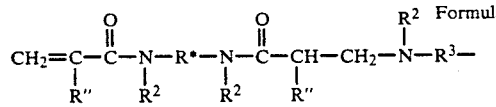    Formula II in which R" is hydrogen atom or methyl, and $R^2$ is hydrogen atom or an alkyl of 1 to 4 carbon atoms, such as methyl, ethyl, propyl, isopropyl, butyl, isobutyl, tertiary butyl. $R^3$ is a divalent hydrocarbon radical having 1 to 10 carbon atoms per radical such as methylene, ethylene, butylene, hexylene, propylene, decylene, $-C_6H_4-$, $-CH_2CH_2C_6H_4-$,

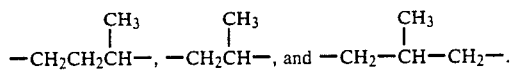

where the preferred $R^3$ are those having 2 to 6 carbon atoms per radical such as ethylene, propylene, isopropylene, butylene, isobutylene, tertiary butylene, pentylene, and hexylene. R* is a divalent hydrocarbon radical. Examples of R* as a divalent hydrocarbon radical include methylene, ethylene, propylene, butylene, hexylene, decylene,

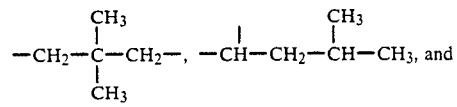

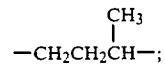

Acrylamide functional polyorganosiloxanes which cure by exposure to ultraviolet radiation are known in the art, for example, Morehouse in U.S. Pat. No. 2,929,829, issued Mar. 22, 1960, teaches that acrylamide compounds can be made by reacting acyl halides with aminoalkyl silicon compounds to produce acylamide functional silicon compounds. Morehouse teaches the following reaction

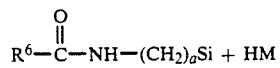

wherein $R^6$ is an alkyl, aryl, alkenyl, or a monovalent heterocyclic ring, M is a halogen atom, and a is an integer of at least 3. When $R^6$ is vinyl, the halogen compound is acryloyl halide and the product formed would be an acrylamide functional silicon compound. Morehouse is hereby incorporated by reference to show a method of preparing acrylamide functional polyorganosiloxanes which can be used in this invention.

The polyorganosiloxanes having acrylamide functionality are taught by Varaprath in U.S. Pat. No. 4,608,270, issued Aug. 26, 1986, which is hereby incorporated by reference to show the preparation of the polyorganosiloxanes having acrylamide functionality. These polyorganosiloxanes have the average unit formula

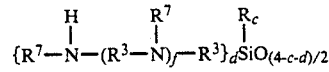

wherein $R^3$ is defined above, R is a monovalent radical such as an alkyl radical, such as methyl, ethyl, propyl, butyl, and cyclohexyl; an aryl radical such as phenyl, 2-phenylethyl, and benzyl; or a fluorinated alkyl radical such as 3,3,3-trifluoropropyl, 2-(perfluoro-ethyl)ethyl and 2-(perfluorobutyl)ethyl, each $R^7$ is independently $R^2$ or

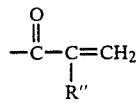

where at least one $R^7$ per molecule is

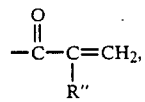

where $R^2$ and R" are defined above, f is 0 or 1, c has a value of from 0 to 2.05, d has a value such that there is at least 0.4 acrylamide functional groups per molecule and up to 0.5 acrylamide groups per silicon atom, preferably d is from 0.001 to 0.04, and c+d has a value of from 0.7 to 2.05. For convenience, Z will be used to represent the acrylamide functional group of the formula

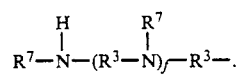

The polyorganosiloxanes preferably contain siloxane units which are free of acrylamide functional radicals such as $MeSiO_{3/2}$, $Me_2SiO_{2/2}$, $MeViSiO_{2/2}$, $MePhSiO_{2/2}$, $Me_3SiO_{\frac{1}{2}}$, $ViMe_2SiO_{\frac{1}{2}}$ and $SiO_{4/2}$ units, in addition to siloxane units which contain the required acrylamide functional substituted hydrocarbon radicals. Symbols Me, Ph and Vi, as used herein, refer respectively to methyl, phenyl and vinyl. The polyorganosiloxanes can contain acrylamide functional groups which have unreacted amine hydrogen atoms such as $ZHNCH_2CH_2NHCH_2CH(CH_3)CH_2Si(CH_3)O_{2/2}$.

Preferred polyorganosiloxanes used in the compositions of this invention are the polydiorganosiloxanes which have the formula $Z'R_2SiO(R_2SiO)_x(Z'RSiO)_ySiR_2Z'$ wherein each Z' denotes, independently, an R radical or Z as described above and x and y denote numbers having average values of from 10 to 5000 and 0 to 500, respectively. The polydiorganosiloxane has on the average at least 0.4 Z per molecule. Examples of preferred polydiorganosiloxanes include, Me₃SiO(Me₂SiO)₅₀₀(MeZ'SiO)₂SiMe₃,
Z'Me₂SiO(Me₂SiO)₂₀₀₀SiMe₂Z',
Z'Me₂SiO(Me₂SiO)₁₀₀(MeZ'SiO)₃SiMe₂Z',
Me₃SiO(MeZ'SiO)₁₀SiMe₃ and
Z'Me₂SiO(MeZ'SiO)₁₀SiMe₂Z'

The polyorganosiloxanes having acrylamide functionality can be prepared by admixing an acryloyl halide with an amino functional polyorganosiloxane having on the average at least 0.4 silicon-bonded amino-substituted hydrocarbon radicals containing at least one nitrogen-bonded hydrogen. The mixture is reacted by using an aqueous solution of a water-soluble alkaline material and a water-insoluble solvent for the amino functional polyorganosiloxane. There should be present at least one acryloyl chloride per one amino hydrogen atom to be converted to acrylamide functionality and at least an equivalent amount of alkaline material relative to the amount of acryloyl chloride. It is to be understood that when acryloyl chloride is referred to, one can substitute methacryloyl chloride.

The amino functional polyorganosiloxanes can contain on the average at least 0.4 amino functional groups which have at least one amino hydrogen atom for conversion into an acrylamide functional group. The silicon-bonded amino-substituted hydrocarbon radical has the formula which is referred to hereinafter, for convenience, as Z''

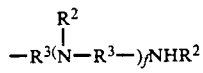

wherein $R^2$ and $R^3$, and f are defined above. Examples of amino-substituted hydrocarbon radicals (amino functional) include, $H_2NCH_2CH_2CH_2-$, $CH_3NHCH_2CH_2CH_2-$, $H_2NCH_2CH(CH_3)CH_2-$, $H_2NCH_2CH_2NHCH_2CH_2CH_2-$, $H_2NCH_2CH_2NHCH_2CH(CH_3)CH_2-$, $H_2N(CH_2)_6NH(CH_2)_3-$, $H_2N(CH_2)_6NHCH_2CH(CH_3)CH_2-$, $H_2N(CH_2)_2N(CH_3)CH_2CH_2CH_2-$, and $CH_3NHCH_2CH(CH_3)CH_2-$.

The amino functional polyorganosiloxane can be siloxanes having the average unit formula

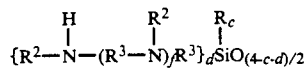

wherein $R^2$, $R^3$, c, f, and d are defined above.

The polyorganosiloxanes can contain siloxane unit which are free of amino-substituted hydrocarbon radicals, such as, $MeSiO_{3/2}$, $Me_2SiO_{2/2}$, $Me_3SiO_{\frac{1}{2}}$, $MeViSiO_{2/2}$, $MePhSiO_{2/2}$, $ViMe_2SiO_{\frac{1}{2}}$ and $SiO_{4/2}$ units, in addition to siloxane unit which contain the required amino-substituted hydrocarbon radicals.

Preferred amino functional polyorganosiloxanes to be converted into acrylamide functionality have the formula $Z^2R_2SiO(R_2SiO)_x(Z^2RSiO)_ySiR_2Z^2$ wherein each $Z^2$ denotes, independently, an R radical or a Z'' radical and x and y denote numbers having average values of from 10 to 5000 and 0 to 500, respectively. The amino functional polydiorganosiloxane have on the average at least 0.4 Z'' per molecule. Examples of preferred amino functional polydiorganosiloxanes to be converted into acrylamide functionality include $Me_3SiO(Me_2SiO)_{500}(MeZ^2SiO)_2SiMe_3$, $Z^2Me_2SiO(Me_2SiO)_{2000}SiMe_2Z^2$, $Z^2Me_2SiO(Me_2SiO)_{100}(MeZ^2SiO)_3SiMe_2Z^2$, $Me_3SiO(MeZ^2SiO)_{10}SiMe_3$, and $Z^2Me_2SiO(MeZ^2SiO)_{10}SiMe_2Z^2$.

Amino functional polyorganosiloxanes are well known in the organosilicon art and need no detailed description as to their preparation. Some are commercially available. The disclosures of Sommer in U.S. Pat. No. 2,557,803, issued June 19, 1951; Speier in U.S. Pat. No. 2,738,357, issued Mar. 3, 1956; Elliott in U.S. Pat. No. 2,754,312, issued July 10, 1956; Speier in U.S. Pat. No. 2,762,823, issued Sept. 11, 1956; U.S. Pat. No. 2,998,406; U.S. Pat. No. 3,045,036; Morehouse in U.S. Pat. No. 3,087,909, issued Apr. 30, 1963; Brown in U.S. Pat. No. 3,355,424, issued Nov. 28, 1967; Plueddemann in U.S. Pat. No. 3,560,543, issued Feb. 2, 1971; U.S. Pat. No. 3,890,269; U.S. Pat. No. 4,036,868; Seiler et al in U.S. Pat. No. 4,152,346, issued May 1, 1979; and Tangney et al in U.S. Pat. No. 4,507,455, issued Mar. 26, 1985 are incorporated herein by reference to further teach how to prepare amino functional polyorganosiloxanes.

The acrylamide functional polyorganosiloxane is made by admixing the acryloyl halide with the amino functional polyorganosiloxane in the presence of an aqueous solution of an alkaline material. The alkaline material can be any water-soluble material having a $pK_b$ value greater than the $pK_b$ of the amine radicals in the amino-substituted hydrocarbon radicals to be converted into the acrylamide functionality. The alkaline material is preferably an alkali metal hydroxide such as sodium hydroxide or potassium hydroxide.

In addition to the aqueous solution of alkaline material, there is also present a water-insoluble solvent for the amino functional polyorganosiloxane when the acryloyl halide is admixed with the amino functional polyorganosiloxane. Said solvent can be any suitable liquid that will not react with the components of the reaction. Preferably, the solvent is also a solvent for the acrylamide functional polyorganosiloxane product of the reaction as well.

Examples of suitable solvents include hydrocarbons such as toluene, xylene, hexane, cyclohexane and heptane; halogenated hydrocarbons such as methylene chloride, chloroform, trichloroethylene and trichloroethane; and oxygenated compounds such as ethyl ether and ethyl acetate. Mixtures of two or more solvents can also be used, it only being required in this instance that the mixture, and not necessarily all the components in the mixture, be a solvent for the amino functional polyorganosiloxane.

The acryloyl halide, the amino functional polyorganosiloxane, the aqueous solution of alkaline material, and solvent, can be mixed in any manner, as long as the acryloyl halide is added to the amino functional polyorganosiloxane in the presence of the alkaline material and the solvent. Preferably the acryloyl halide, or a solution thereof, is added to a well agitated mixture of aqueous alkaline material and solvent solution of amino functional polyorganosiloxane. The reaction should be carried out at a temperature of from about 0° to 10° C. to minimize the production of undesirable by-products and to increase the conversion.

The amounts of the components to be used in this method are not narrowly critical, it only being necessary to have present a sufficient amount of alkaline material to neutralize all hydrogen halide as it is produced when the acryloyl halide reacts with the nitrogen-bonded hydrogen atoms and a sufficient amount of acryloyl halide to convert the amount of amino functionality to acrylamide functionality as desired.

The alkaline material and the acryloyl halide are preferably used in equivalent amounts; e.g. one molecule of sodium hydroxide for every molecule of acryloyl chloride, although an excess of the alkaline material relative to the amount of hydrogen halide produced has not been found to be detrimental to the desired result of the reaction. A deficiency of alkaline material relative to the amount of hydrogen halide produced is to be avoided.

The amount of water that is used in this method should be sufficient to dissolve the alkaline material and, preferably, provide a less-than-saturated solution thereof. A 2% solution of sodium hydroxide has been found to be desirable.

The amount of solvent that is used in this method should be sufficient to dissolve the amino functional polyorganosiloxane and, preferably, the acrylamide functional polyorganosiloxane product as well.

During and after the addition of the acryloyl halide to the amino functional polyorganosiloxane, the reaction mixture should be thoroughly agitated to maintain an intimate contact between the aqueous and nonaqueous phases. Low shear means such as stirrers, paddles and impellers are sufficient to maintain the agitation until the acrylation reaction is finished, typically within an hour.

After the reaction is finished, the organic phase is separated from the aqueous phase and the product of the reaction (in the organic phase) is separated from the solvent. It may be desirable to add a polymerization inhibitor to the solution prior to any separating action, such as distilling or fractionating, to avoid undesirable polymerization of the acrylamide groups.

In particular, curable compositions of this invention which are useful for coating can be made from, a fully acrylylated polydiorganosiloxane having the formula $$ZR_2SiO(R_2SiO)_z(ZRSiO)_gSiR_2Z$$

wherein Z and R have the meanings noted above, z has a value of from 10 to 2000 and g has a value of from 0 to 0.1z. Preferably, the acrylamide functional polydiorganosiloxane having the above formula has a viscosity of from 100 to 10,000 centipoise when the curable composition is to be used as a solventless coating composition.

Examples of acrylamide functional polydiorganosiloxanes having the above formula include $$ZMe_2SiO(Me_2SiO)_zSiMe_2Z,$$

$$Me_3SiO(Me_2SiO)_z(ZMeSiO)_hSiMe_3 \text{ and}$$

$$ZMe_2SiO(Me_2SiO)_z(ZMeSiO)_hSiMe_2Z,$$

wherein h has a value of from greater than 0 to 0.1z and z has the value noted above. In these polydiorganosiloxanes, h has a value such that the polydiorganosiloxane contains on the average at least 0.4 acrylamide functional groups per molecule. Compositions prepared from acrylamide functional polydiorganosiloxane which have on the average one, two, or more are very useful for making ultraviolet radiation curable coating materials.

A copending application, Ser. No. 07/335,908, filed Apr. 10, 1989, filed on even date with this application, and assigned to the same assignee, in the name of Michael A. Lutz and entitled "ULTRAVIOLET CURED GELS WITH CONTROLLED MODULUS AND VISCOSITY" is hereby incorporated by reference to show acrylamide functional polydiorganosiloxane compositions which cure to gels by exposure to ultraviolet radiation and are useful for coating, encapsulating, and potting electronic devices which have fragile components. These compositions are preferred and exhibit significant improvement in thermal stability with the presence of zinc naphthenate, stannous octoate, or organotitanate.

These compositions having gel-like properties are unique in that their hardness can have a predetermined durometer at a predetermined viscosity, i.e. the viscosity of the uncured composition and the hardness of the cured composition can be independently controlled. These compositions comprise a blend of acrylamide functional polydiorganosiloxanes and a photosensitization system for curing the blend when irradiated with ultraviolet radiation, wherein the blend is (A) 4 to 90 mole percent of an acrylamide functional endblocked polydiorganosiloxane of the general formula $$YR'_2SiO(R_2SiO)_nSiR'_2,$$

(B) 9 to 50 mole percent of a mono-acrylamide functional endblocked polydiorganosiloxane of the general formula $$R'_3SiO(R_2SiO)_nSiR'_2Y,$$

and (C) 0 to 65 mole percent of a non-functional polydiorganosiloxane of the formula $$R'_3SiO(R_2SiO)_nSiR'_3$$

where, in the above formulae, R is a monovalent radical selected from the group consisting of alkyl, aryl, and fluorinated alkyl; each R' is independently selected from the group consisting of R, and hydroxyl, Y is an acrylamide functional radical bonded to silicon atom through silicon-carbon bond where the acrylamide function has Formula I or Formula II, and n has a value of from 30 to 3,000, the mole percentages being based on the total blend as 100 mole percent and where the polydiorganosiloxanes of the blend are present in amounts to provide 20 to 95 percent of the endblocking as acrylamide functionality and 5 to 80 percent of the endblocking as non-functional.

The acrylamide functional polydiorganosiloxanes of (A) are those which have two acrylamide functions per molecule, one per terminating or endblocking siloxane unit, and has the general formula $$YR'_2SiO(R_2SiO)_nSiR'_2Y,$$

in which Y, R, R', and n are defined above. Each R' is independently selected from hydroxyl and a radical represented by R. The acrylamide functional polydiorganosiloxanes of (A) can have a degree of polymerization such that the value of n ranges from 30 to 3,000, preferably from 50 to 1,000 in which the preferred diorganosiloxane units are selected from the group consisting of dimethylsiloxane, phenylmethylsiloxane, diphenylsiloxane, and methyl-(3,3,3-trifluoropropyl)siloxane.

Acrylamide functional polydiorganosiloxanes of (A) can be those in which the acrylamide is N-alkyl-N- acrylamide or N-alkyl-N-methacrylamid. The acrylamide polydiorganosiloxane of (A) contains two acrylamide functional groups bonded to silicon atoms through Si-C bonds on the terminal silicon atoms of the polymer chain. The remaining organic groups bonded to the silicon atoms of the polyorganosiloxane are defined above for R and are preferably methyl, phenyl, or 3,3,3-trifluoropropyl. The acrylamide functional polydiorganosiloxanes are known in the art from Varaprath cited above and is hereby further incorporated by reference to show the polyorganosiloxanes with acrylamide functionality on the chain terminals where the useful polymers are those made from secondary amine functional polydiorganosiloxanes and to show the methods of making such polymers. The siloxane units can include dimethylsiloxane units, diphenylsiloxane units, methylphenylsiloxane units, methyl-3,3,3-trifluoropropylsiloxane units, and siloxane units having an acrylamide functional group of Formula I in which $R^2$ is hydrogen atom or an alkyl radical of one to four carbon atoms such as methyl, ethyl, propyl, or butyl, $R^3$ is a divalent hydrocarbon radical of 2 to 6 carbon atoms, such as ethylene, propylene, isobutylene, and hexylene. When R" is hydrogen, the acrylamide functionality is the acrylyl radical and when R" is methyl, the acrylamide functionality is the methacrylyl radical. Polydiorganosiloxanes endblocked with

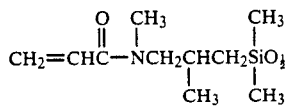

are preferred.

The mono-acrylamide functional endblocked polydiorganosiloxanes of (B) are not particularly well known but can be prepared by many of the methods used to prepare the acrylamide functional polydiorganosiloxanes of (A). The mono-acrylamide functional endblocked polydiorganosiloxanes of (B) can be made by first preparing a polydiorganosiloxane in which some of the endblocking units are triorganosiloxy in which the organic groups are alkyl, aryl, or fluoroalkyl and the remainder of the endblocking units are hydroxyl. Dupree shows such polymers in U.S. Pat. No. 3,274,145, issued Sept. 20, 1966, which is hereby incorporated by reference to show the polymers and their preparation.

The mono-acrylamide functional endblocked polydiorganosiloxanes of (B) can also be prepared by several methods by selecting the proper starting materials. It is difficult to prepare the polydiorganosiloxanes of (B) in the pure form, that is, where all the molecules have one non-functional endblock and one acrylamide functional endblock. Most of the economical methods of the preparation of polydiorganosiloxanes involves the use of equilibration methods and these methods produce statistical distributions of molecular species. For example, the preparation of polydiorganosiloxane (B) in which the acrylamide functional endblock uses the method of reacting a silane with hydroxyl endblocked polydiorganosiloxane in the presence of a catalyst can be used if a starting polydiorganosiloxane is one in which some of the molecules have one hydroxyl endblock and one non-functional endblock such as trimethylsiloxy unit. Such polydiorganosiloxanes are known from Dupree, which is cited above, and is hereby incorporated by reference to show the preparation of polydiorganosiloxane with some of the molecules having one hydroxyl endblock. These hydroxyl endblocked polydiorganosiloxanes will contain a distribution of molecules such that some of the molecules will have two hydroxyl endblocking groups, some of the molecules will have one hydroxyl endblocking group and one non-functional endblocking group (a triorganosiloxy unit), and some of the molecules will have two non-functional endblocking groups (triorganosiloxy units). The amount of each type of polydiorganosiloxane which is in the polymer mixture will depend upon the ingredients used to prepare it. Polydiorganosiloxanes used for (B) can be controlled best by selecting a method which will provide the desired number of molecules with one hydroxyl endblock. The number of acrylamide functional endblocked polydiorganosiloxane (A) molecules and the number of non-functional polydiorganosiloxanes (C) can then be varied to make a variety of blends. Starting with a polydiorganosiloxane with hydroxyl endblocks such as described by Dupree, one can use the method of reacting an acrylamide functional/alkoxy silane with these polydiorganosiloxanes in the presence of a condensation catalyst such as organotitanates to make the mono-acrylamide functional endblocked polydiorganosiloxane (B). Similarly, other methods can be used to make various kinds of (B) polydiorganosiloxanes such as those described for making the acrylamide functional endblocked polydiorganosiloxane of (A) except that the starting ingredients include a precursor for providing some non-functional endblocking groups. It is possible to prepare directly a composition having the mole percentage values of (A), (B), and (C) within the limits stated above by using such methods.

The non-functional endblocked polydiorganosiloxanes of (C) are well known in the art and can be obtained commercially. These non-functional polydiorganosiloxanes are also produced by the methods of making polydiorganosiloxanes of (B) which use equilibration techniques.

As stated above, the mole percentages of (A), (B), and (C) are such that (A) is present in amounts to provide 4 to 90 mole percent, (B) is present in amounts to provide 9 to 50 mole percent, and (C) is present in amounts to provide from 0 to 65 mole percent. Those compositions having a blend with zero mole percent (C) are prepared by techniques which use non-equilibration methods for preparing the polydiorganosiloxanes such as the living polymer method in which cyclic trimer of dimethylsiloxane units is polymerized with alkyl lithium. Such methods can produce polydiorganosiloxanes with one hydroxyl endblock and one triorganosiloxy endblock. The blends of this invention are those which are composed of (A), (B), and (C) to provide 20 to 95 percent of the endblocks as acrylamide functionality and 5 to 80 percent of the endblocks as non-functional. The preferred blends contain 45 to 80 percent acrylamide functional endblocks and 20 to 55 percent non-functional endblocks.

The polydiorganosiloxanes of (A) and (B) can be made by a Michael addition method if the appropriate precursors, namely amine endblocked polydiorganosiloxanes, are used where there is an amine on both ends of the polydiorganosiloxane to make (A) and where there is an amine on only one end of the polydiorganosiloxane with the other end being non-functional to make (B). Such polydiorganosiloxanes can be used to make the gel compositions of this invention.

Lee et al in U.S. Pat. No. 4,697,026, issued Sept. 29, 1987, teach acrylamide functional endblocked polydiorganosiloxanes which are made by a Michael addition of diacrylamide or dimethacrylamide functional compounds with primary or secondary amine functional polydiorganosiloxanes. Lee et al is hereby incorporated by reference to show the preparation of polymers which use the Michael addition method.

Acrylamide functional endblocked polydiorganosiloxanes prepared by the Michael addition method are those having at least one acrylamide functional endblocking siloxane unit of the general unit formula

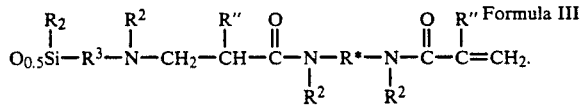

Formula III wherein $R^3$, $R^2$, R, R'', and R* are defined above, b is 0, 1, or 2, and the repeating siloxane units present in the polydiorganosiloxane are these having the general unit formula $R_2SiO$ in which R is defined above.

For polydiorganosiloxane of (A), one type of preferred Michael addition polydiorganosiloxane containing acrylamide functionality endblocking is one in which, R is methyl, $R^3$ is

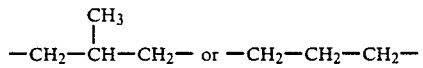

$R^2$ is methyl, R'' is hydrogen atom, R* is a divalent hydrocarbon radical of the general formula $-(CH_2)_j-$ in which j is an integer of from 1 to 6 and there is an average of 30 to 3,000 dimethylsiloxane units per molecule.

For Michael addition polydiorganosiloxanes of (B), the polymers would be as described above for (A) except that they would have one endblocking triorganosiloxy unit and the other endblocking unit would be the acrylamide functional endblocking siloxane unit of Formula III.

The acrylamide functional endblocked polydiorganosiloxanes of (A) and (B) can be prepared by intimately mixing an amino functional polydiorganosiloxane having endblocking with one primary amine group or secondary amine group per polymer terminal with an acrylamide functional compound having two acrylamide or methacrylamide groups per molecule. When the amine polydiorganosiloxane and acrylamide compound are mixed, there is a reaction which produces acrylamide functional endblocked polydiorganosiloxane and depending upon the amine precursor, whether it has an amine function on both ends or only one end will determine whether it is a polydiorganosiloxane of (A) or (B). This reaction is known as the Michael-type addition reaction. This reaction occurs at room temperature but is rather slow for many commercial applications, for example, the reaction may take as long as 24 hours or more to convert only 40% of the amine to the acrylamide functionality.

Heating the mixture increases the rate of the reaction and at 70° C. as much as 80% of the amine can be converted to the acrylamide functionality. The mixture should not be heated above 100° C. because temperatures above 100° C. can cause considerable loss of the acrylamide functionality due to a free radical initiated chain reaction. Free radical scavengers, such as p-methoxy-phenol, are useful to inhibit the unwanted chain reaction, but these scavengers also inhibit the reactivity of the final acrylamide functional endblocked polydiorganosiloxane during its use, unless they are removed. Although free radical scavengers can be used, their use would add expense to making high purity acrylamide functional endblocked polydiorganosiloxanes.

The best reaction conditions are those in which the intimate mixture is formed using a promoter solvent, such as an alcohol. The preferred alcohols are those which can readily be removed from the reaction product without having to heat it to too high of a temperature. Examples of promoter alcohols are ethanol and isopropanol. The use of the promoter solvent can increase the rate of the reaction such that 90 to 95% of the amine is converted to the acrylamide functionality. The fastest reactions would be those using a promoter solvent and heating the mixture to a temperature above 25° C. and below 100° C.

This method offers the advantage that the acrylamide functional endblocked polydiorganosiloxane can be prepared in the desired structural form before the acrylamide functionality is in place on the molecule. The amine functional endblocked polydiorganosiloxane can withstand the higher temperatures of preparation than if the acrylamide functionality would be present on the precursors used in preparing the polydiorganosiloxane. For example, the preparation of poly(co-diphenyl-siloxane-co-dimethylsiloxane) requires an alkaline equilibration catalyst with heating to high temperatures, such as 150° C., of a mixture of cyclopolydimethylsiloxane and cyclopolydiphenylsiloxane. The preparation of a polymer having dimethylsiloxane units, diphenylsiloxane units, and siloxane terminating units having acrylamide functionality could not survive the reaction without causing the acrylamide functionality to polymerize and thus an acrylamide functional polydiorganosiloxane of this type could not be produced. For example, a mixture of cyclopolydimethylsiloxane, cyclopolydiphenylsiloxane, alkaline equilibration catalyst, and an amine bearing siloxane precursor could be used to make an amine functional endblocked poly(co-diphenylsiloxane-co-dimethylsiloxane) which could then be converted into an acrylamide functional endblocked polydiorganosiloxane at a lower temperature. The amine functionality can survive such reactions much more readily than the acrylamide functionality.

The amine functionality can be either primary or secondary. The primary amine functionality reacts much more readily than the secondary amine functionality. For this reason, the di-functional acrylamide compounds readily react with primary amine and the remaining amine hydrogen atom does not readily react with the acrylamide functional group. Such a difference in reaction rates between the primary and secondary amines can be used to advantage in the preparation of acryl functional endblocked polydiorganosiloxanes of either (A) or (B). After one of the acrylamide groups of the di-functional compound reacts with the primary amine, the reaction can be stopped by adding monofunctional acrylamide compounds to react with the remaining secondary amine hydrogens.

The reaction between the amine functional endblocked polydiorganosiloxane and the di-functional acrylamide compound can be stopped by adding a monofunctional acrylamide compound to the reaction mixture. The monofunctional acrylamide compound can be added at two points during the reaction. The amine functional endblocked polydiorganosiloxane and the di-functional acrylamide compound can be mixed, and at the point one wishes the reaction stopped, the mono-functional acrylamide compound is added. One could also add the monofunctional acrylamide compound at the beginning of the reaction, but this uses up amine hydrogen atoms, especially primary amine hydrogen atoms. The monofunctional acrylamide compound is preferably added after the reaction has begun so that the monofunctional acrylamide compounds do not compete with the di-functional acrylamide compounds in such a manner that the number of acrylamide groups on the final silicon compound is not the desired product.

The reaction can also be stopped by another method in which the reaction between the di-functional acrylamide compound and the amine functional endblocked polydiorganosiloxane is stopped by adding an acid anhydride. Using the acid anhydride to stop the reaction has the same benefits as using a monofunctional acrylamide compound with respects to shelf stability, but the use of the acid anhydride has the added advantage that a new compound is formed, namely one in which the acrylamide functional endblocked polydiorganosiloxane has the following group

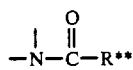

wherein R** is a monovalent hydrocarbon radical or a radical of the general formula —R$^3$—COOH in which R$^3$ is defined above.

The amounts of amine functional endblocked polydiorganosiloxane and the acrylamide functional compound should be such that there is at least one molecule of acrylamide functional compound per two primary amine hydrogens or one secondary amine hydrogen (wherein these primary and secondary hydrogen atoms are before any reaction with the di-functional acrylamide compound begins). The foregoing ratio of acrylamide functional compound to primary amine hydrogen does not mean that the secondary amine hydrogen atoms do not react but only that they react slower and can be readily stopped from reacting by the above mentioned methods.

The amine functional endblocked polydiorganosiloxane can be any of those known in the art which have primary and secondary amine functionality at the chain terminals. These amine functional polydiorganosiloxanes can be prepared by methods well-known in the art as referenced above and many are commercially available.

Amine functional silanes used to make the endblocked polydiorganosiloxanes are exemplified by the following general formula

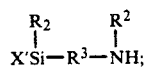

wherein R$^3$, R$^2$, and R, are defined above, X' is illustrated by an alkoxy radical or an N,N-dialkylamino radical. Examples of alkoxy radical are methoxy, ethoxy, propoxy, butoxy, 2-ethylhexoxy, isopropoxy, hexyloxy, 2-methoxyethoxy, 2-ethoxyethoxy. Examples of N,N-dialkylamino radicals are dimethylamino, diethylamino, and diisopropylamino. An example of such silanes is, delta-aminobutyldimethylmethoxy-silane, These silanes can be used to endblock the polydiorganosiloxane to provide the amine functional endblocked polydiorganosiloxanes which can be used to make acrylamide functional endblocked polydiorganosiloxanes of (A) or (B).

An example of amine functional endblocked polydiorganosiloxanes for making acrylamide functional endblocked polydiorganosiloxanes of (A) is one of the following formula

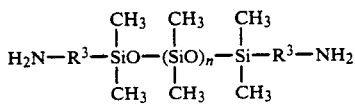

in which R$^3$ is defined above and n has an average value of 30 to 3,000, preferably from 50 to 1,000. An amine functional endblocked polydiorganosiloxane for making acrylamide functional endblocked polydiorganosiloxanes of (B) is one having the following general formula

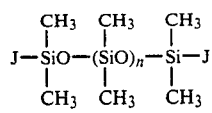

in which n is defined above; one J is methyl and one J is —R$^3$—NH$_2$ or —R$^3$—NHR$^2$, where R$^2$ and R$^3$ are defined above.

The di-functional acrylamide compounds used to make the acrylamide functional endblocked polydiorganosiloxane are available commercially or can be made by well-known methods. Examples of the difunctional acrylamide compounds include

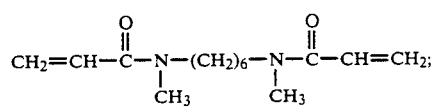

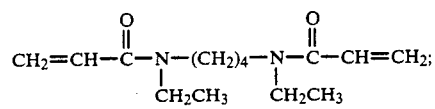

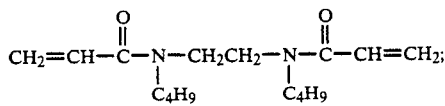

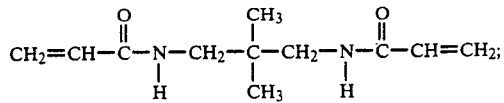

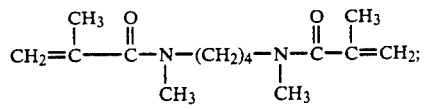

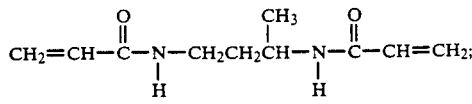

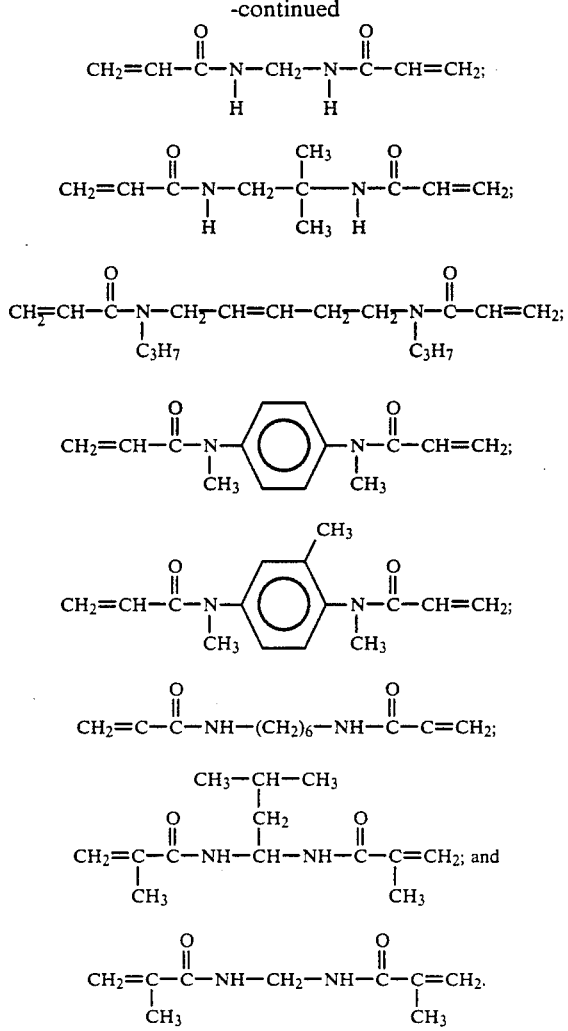

N,N'-dimethylacrylamide can be used to stop the reaction between the di-functional acrylamide compound and the amine functional endblocked polydiorganosiloxane. The anhydrides which can also be used to stop the reaction and are illustrated by acetic anhydride, propionic anhydride, butyric anhydride, isovaleric anhydride, caproic anhydride, palmitic anhydride, stearic anhydride, succinic anhydride, and glutaric anhydride.

Silanes which have the acrylamide functionality can be used to prepare the acrylamide functional endblocked polydiorganosiloxane of either (A) or (B) by reacting the silane with the hydroxyl endblocked polydiorganosiloxane in the presence of a condensation catalyst as described above. Such silanes can be of the following general formula

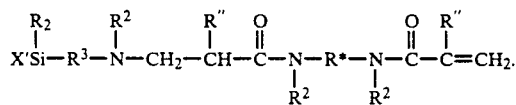

wherein $R^3$, $R^2$, R, X', R" and R*, are defined above. Preferably, $R^3$ is an alkylene radical of 3 to 10 carbon atoms, R is methyl, R" is hydrogen, and R* is a divalent hydrocarbon radical.

The gel compositions comprise the heat stability additive, the blend of polydiorganosiloxanes (A), (B), and (C) and a photosensitization system which comprises a photoinitiator useful in curing the acrylamide functional endblocked polydiorganosiloxanes to form a gel with a hardness and modulus suitable for encapsulating and/or coating electronic devices which have fragile components. The compositions are cured by exposure to ultraviolet radiation.

The photosensitization system is in the simplest form, a photoinitiator. It can also include other ingredients which provide some function to the photocurable process, such as the presence of chain transfer agents, like an amine, especially tertiary amines. Other ingredients are known in the art.

The photoinitiator is used in amounts sufficient to provide the desired cure of the gel composition. Examples of photoinitiators include benzoin; benzoin alkyl ethers such as methyl, ethyl, isopropyl, and isobutyl benzion ethers; acetophenone derivatives, such as dialkoxyacetophenone exemplified by diethoxyacetophenone, dichloroacetophenone, trichloroacetophenone, alpha,alpha-dimethoxy-alpha-phenylacetophenone, 1-hydroxycyclohexylphenyl ketone, 2-hydroxy-2-methyl-1-phenylpropan-1-one, methylphenyl glyoxylate, 4-benzoylbenzyltrimethylammonium chloride, alpha-acyloxime esters such as 1-phenyl-1,2-propanedione-2-(O-ethoxycarbonyloxime), benzophenone in combination with a chain transfer agent such as an amine and azo-bis-(isobutyronitrile), benzil ketals, and ketone amine derivatives. Polysilanes are useful in the compositions which are to be cured by ultraviolet radiation. The polysilane photoinitiators are those which have a chain of catenated silicon atoms in either a linear configuration or in a ring configuration. The polysilanes must be soluble in the blend. The polysilanes can be the phenylmethylpolysilanes defined by West in U.S. Pat. No. 4,260,780, issued Apr. 7, 1981 which is hereby incorporated by reference; the aminated methylpolysilanes defined by Baney et al. in U.S. Pat. No. 4,314,956, issued Feb. 9, 1982, which is hereby incorporated by reference; the methylpolysilanes of Peterson et al. in U.S. Pat. No. 4,276,424, issued June 30, 1981 which is hereby incorporated by reference; and the polysilastyrene defined by West et al. in U.S. Pat. No. 4,324,901, issued Apr. 13, 1982 which is hereby incorporated by reference.

Photoinitiators which are particularly useful in these compositions include

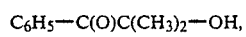

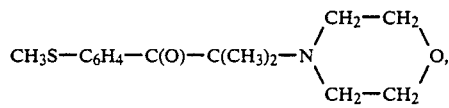

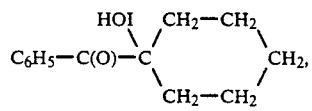

and bezoin methyl ether.

The gel compositions comprising the heat stability additive, the blend, and photoinitiator are reasonably stable during storage but for additional protection and for exceptional situations one may find it advantageous to add a storage stabilizer. The compositions can contain a storage stabilizer including amines, particularly tertiary amines such as diisopropylaminoethanol and trioctylamine. Another type of viscosity stabilizer is the free radical scavenger type, such as p-methoxyphenol (also known as monomethyl ether of hydroquinone), catechol, 4-t-butylcatechol, phenothiazine, hydroquinone, 2,6-di-t-butyl-p-methylphenol, and N-phenyl-2-naphthylamine. The free radical scavenger viscosity stabilizers are used in amounts of preferably zero to one weight percent based on the weight of the composition. If free radical scavenger is used the amounts should be small such as from 0.001 to 0.1 weight percent.

Compositions of this invention can contain optional ingredients which may be suitable for some applications, however, those which effect the uncured viscosity, hardness of the cured material, electrical properties, corrosive nature of the composition both uncured and cured should be evaluated when the compositions are to be used as a coating, encapsulant or potting compound for fragile electronic devices. Examples of optional ingredients which might be considered include surfactants, reinforcing agents such as fillers and resins, colorants, and other property modifiers.

The compositions of this invention can be used in many kinds of applications in which curing by ultraviolet radiation is acceptable. Particularly suitable applications are those in which electrical and electronic equipment is to be protected, such as for coating, encapsulating, or potting electronic devices. The compositions of this invention cure to products which vary from hard resin type materials to elastomeric materials to soft gel materials. Some of the compositions are useful for paper coatings. The compositions of this invention provide cured products with improved heat or thermal stability compared to the same compositions without the additives. The additives also appear to maintain the electrical properties after heat aging, even under humid conditions.

The gel compositions of this invention rapidly cure when exposed to ultraviolet radiation, usually in a few seconds, and because they are based on polyorganosiloxane, they are suitable for integrated circuit protection. These compositions have high ionic purity, low moisture uptake, provide stress relief even at low temperatures, have excellent electrical properties, are thermally stable, and can protect against harsh environments. Because of the nature of the gel compositions to independently vary the viscosity and the hardness, they are useful for photobarrier processing involving "in-situ" generation of flow barriers during material application, and photoimaging to allow wafer stage application of permanent protective coatings. The compositions are shelf stable and can be shipped as a one package container product. The gel compositions can be used to protect integrated circuits and can be used in manufacturing where rapid processing is needed, such as automated production lines.

The following examples are presented for illustrative purposes and should not be construed as limiting this invention which is properly delineated in the claims. In the following examples, "part" or "parts" represents "part by weight" or "parts by weight" and the viscosity is measured at 25° C. unless otherwise stated.

EXAMPLE 1

An amino functional polydiorganosiloxane (Amino-blend A) was prepared by mixing in a 2-liter, 3-necked flask fitted with a thermometer, nitrogen purge, stirrer, and condenser, 9.08 g of trimethylsiloxy endblocked polydimethyl-siloxane having a viscosity of 2 centistokes and an average formula of

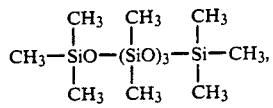

21.58 g of a disiloxane of the formula

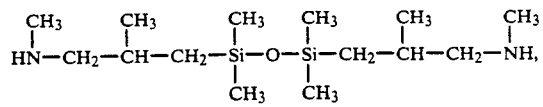

192.96 g of poly(methylphenylsiloxane) cyclics having from 3 to 6 methylphenylsiloxane units per molecule, and 1276.38 g of poly(dimethylsiloxane) cyclics having from 3 to 6 dimethylsiloxane units per molecule. The resulting mixture was heated for one hour at 150° C. to dry the ingredients while purging with dry nitrogen gas and then cooled to 50° C. and then catalyzed with 1.52 g of potassium silanolate, and 7.5 g of dimethylformamide. The catalyzed mixture was heated for 20 hours at 150° C., cooled, neutralized with dry ice for 30 minutes, and then pressure filtered. The mixture became viscous about 3 hours after catalysis and then the viscosity dropped, which indicated that the reaction requires at least 4 hours to reach equilibrium. After the reaction product was filtered, it was stripped at 170° C. at 5 mm of Hg. The resulting polymer mixture, a light yellow fluid, was designated Amino-blend A, and had an average formula

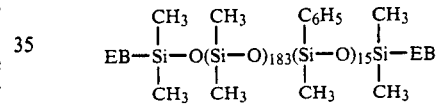

in which EB represents the endblocking in this polymer mixture. The mixture contained according to the calculated values, 56.25 mole percent of the polymer molecules having two amino functional endblocking groups of the formula

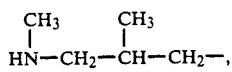

37.5 mole percent of the polymer molecules having one EB being the amino functional radical as shown above and the other EB group being methyl (non-functional), and 6.25 mole percent of the polymer molecules being endblocked with methyl groups (non-functional). Other descriptions herein of the mole percentages of the blends obtained by equilibration methods are calculated values. Amino-blend A had 75 percent of the endblocking groups as amino groups and 25 percent of the endblocking groups as methyl groups. Amino-blend A had a viscosity of 1,200 centipoise and a molecular weight, $M_w$, of 24,229 with an amine neutral equivalent of 10,560 g/eq.

An acrylamide functional polydiorganosiloxane (Acrylamide-blend A) was prepared by mixing in a 3-liter, 3-necked flask equipped with a stirrer, a condenser, a thermometer, and an addition funnel, 400 g of Amino-blend A, 1200 cc of methylene chloride, 23.9 cc of a 2N aqueous sodium hydroxide solution, 20 cc of a 15 weight percent sodium nitrite aqueous solution, and 356 cc of water. The temperature was reduced to about 0° C. and 3.38 cc (3.77 g) acryloyl chloride in 6.8 cc of methylene chloride as added to the stirred Amino-blend A mixture. The addition was completed within 5 to 10 minutes and the reaction was continued for 30 minutes while allowing the temperature to warm to room temperature. The resulting mixture was separated into methylene chloride solution and aqueous solution. The aqueous solution was discarded along with three subsequent water washings of the methylene chloride layer. The methylene chloride solution was put into a freezer overnight, removed, filtered through glass wool to remove ice, and then neutralized with calcium carbonate by mixing with 1 g of calcium carbonate per 10 g of polymer. The resulting mixture was stirred overnight, pressure filtered, and then the methylene chloride was removed on a rotary evaporator up to 40° C. at less than 10 mm of Hg. The resulting product was a clear fluid with a slightly yellow color, is designated herein as Acrylamide-blend A, and had an average formula as follows

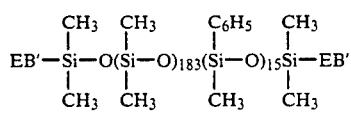

Formula A in which EB' represents the endblocking in this polymer mixture. The mixture contained according to the calculated values, 56.25 mole percent of the polymer molecules having two acrylamide functional endblocking groups of the formula

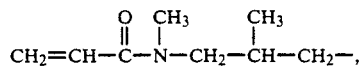

37.5 mole percent of the polymer molecules having one EB' being the acryl functional radical as shown above and the other EB' group being methyl (non-functional), and 6.25 mole percent of the polymer molecules being endblocked with methyl groups (non-functional). Acrylamide-blend A had 75 percent of the endblocking groups as acrylamide groups and 25 percent of the endblocking groups as methyl groups. Acrylamide-blend A had a viscosity of 1184 centipoise measured in accordance with ASTM-D1084B, and a molecular weight with an $M_w$ of 18,040 and an $M_n$ of 25,305. The Acrylamide-blend A had 6.79 weight percent volatiles when heated for 2 hours at 150° C.

Ultraviolet radiation curable compositions were prepared by cold blending Acrylamide-blend A, 1 weight percent of a photoinitiator, either 2-hydroxy-2-methyl-1-phenylpropan-1-one (Darocur TM 1173), hereinafter referred to as P-1, or (1-hydroxycyclohexyl)-phenylmethanone (Irgacure TM 184), hereinafter referred to as P-2, and an additive compound in an amount of from 0.5 to 2 weight percent. The weight percentages of the photoinitiator and additive compound were based on the weight of the Acrylamide-blend A. Table I shows the compositions made and their appearance which was an indicator of the compatibility or lack thereof of the ingredients, namely the additive compound. Incompatibility, as indicated by the degree of haze was considered to be phase separation.

TABLE I

| COMPOSITION | PHOTO-INITIATOR | ADDITIVE COMPOUND | APPEARANCE |
|---|---|---|---|
| 1. | P-1 | NONE | CLEAR |
| 2. | P-2 | NONE | CLEAR |
| 3. | P-2 | 0.5 wt % tetrabutyl titanate | QUITE HAZY |
| 4. | P-2 | 1 wt % tetrabutyl titanate | OPAQUE |
| 5. | P-2 | 2 wt % tetrabutyl titanate | VERY OPAQUE |
| 6. | P-2 | 1 wt % stannous octoate | CLEAR |
| 7. | P-2 | 1 wt % platinum complex (1) | CLEAR |
| 8. | P-2 | 1 wt % cobalt naphthenate | PURPLE-CLOUDY GEL PARTICLES |
| 9. | P-2 | 1 wt % zinc naphthenate | CLEAR, LIGHT TAN COLOR |
| 10. | P-2 | 1 wt % cupric naphthenate | GREEN, WITH CHUNKS |
| 11. | P-2 | 1 wt % manganese octoate | CLEAR, LIGHT BROWN |
| 12. | P-2 | 1 wt % cobalt octoate | PURPLE, CLEAR |

(1) a chloroplatinic acid complex with tetramethyldivinyldi-siloxane

Each of the compositions described in Table I were poured into test cups to a thickness of 180 mils and were then irradiated with ultraviolet radiation from a UVEXS Model 750 A UV cure unit (LCU) manufactured by UVEXS Inc., Mountain View, Calif. Each pass through the LCU gave a dose of 400 mJ/cm$^2$ as measured by an IL 390 Light Bug manufactured by International Light. Each composition sample was given 15 passes through the LCU, the cured thickness after 15 passes was noted, and the hardness was measured by the durometer on the Shore OO scale. The cure response was reported as the depth of cure in mils per exposure to 150 mJ/cm$^2$ where samples of each composition were coated on aluminum Q-panels. The results were as shown in Table II.

TABLE II

| COMPOSITION | CURED THICKNESS | SHORE OO | CURE RESPONSE, mils |
|---|---|---|---|
| 1. | 180 mils | 49 | 35 |
| 2. | 180 mils | 50 | 40 |
| 3. | 180 mils | 53 | 21 |
| 4. | 180 mils | 45 | 10 |
| 5. | 170 mils (2) | 28 | 0 |
| 6. | 180 mils | 47 | 55 |
| 7. | 180 mils | 48 | 31 |
| 8. | 170 mils | 53 | 18 |
| 9. | 180 mils | 48 | 38 |
| 10. | 30 mils | 41 | 20 |
| 11. | 170 mils | 50 | 20 |
| 12. | 40 mils (2) | 52 | 10 |

(2) additional passes were given on the back to cure the sample completely through Samples of each composition were tested for heat stability (thermal stability) by completely curing a 180 mil thick sample by irradiating with ultraviolet radiation. The hardness as measured by the durometer on the Shore OO scale was determined and then the samples were placed in a 150° C. forced air oven and the Shore OO was measured after the stated time periods. The percentage change shown in Table III is between the initial Shore OO value and the Shore OO value after 42 days at 150° C. (1,000 hours).

TABLE III

| COMPOSITION | INITIAL | SHORE OO, after | | | | | | CHANGE |
|---|---|---|---|---|---|---|---|---|
| | | 1 DAY | 3 DAYS | 7 DAYS | 14 DAYS | 21 DAYS | 42 DAYS | |
| 1. | 50 | 45 | 42 | 35 | 32 | 25 | 16 | −68% |
| 2. | 50 | 44 | 42 | 39 | 33 | 30 | 14 | −72% |
| 3. | 52 | 49 | 49 | 49 | 49 | 48 | 43 | −17% |
| 4. | 44 | 49 | 44 | 44 | 45 | 45 | 39 | −11% |
| 5. | 28 | 31 | 32 | 33 | 37 | 38 | 40 | +43% |
| 6. | 49 | 55 | 54 | 55 | 53 | 53 | 42 | −14% |
| 7. | 50 | 50 | 50 | 44 | 40 | 36 | 24 | −52% |
| 8. | 52 | 41 | 40 | 40 | 32 | 31 | 21 | −60% |
| 9. | 47 | 46 | 48 | 49 | 48 | 46 | 44 | −6% |
| 10. | 40 | 42 | 41 | 45 | 44 | 50 | 53 | +32% |
| 11. | 49 | 45 | 41 | 38 | 26 | 26 | 14 | −71% |
| 12. | 52 | 41 | 37 | 35 | 26 | 22 | 15 | −71% |

From the results of the above heat stability test, three additives exhibited improved heat stability at 150° C. aging. These compounds were tetrabutyl titanate, zinc naphthenate, and stannous octoate. Tetrabutyl titanate exhibited the best improvement at one weight percent concentration as shown by composition 4. Composition 5 showed that at 2 weight percent tetrabutyl titanate, the composition increased substantially in durometer upon heating and therefore, the preferred effective amount was less than 2 weight percent. Composition 3 showed that less than 0.5 weight percent was not as effective as greater than 0.5 weight percent when the photoinitiator was (1-hydroxycyclohexyl)phenylmethanone, thus the preferred range of tetrabutyl titanate is between 0.7 and 1.5 weight percent.

Composition 6 using stannous octoate as the additive showed an increase in durometer but upon continued heat aging exhibited a decrease in durometer of about 14%. Although stannous octoate exhibited acceptable performance, zinc naphthenate gave the best results with the durometer not varying more than 6% over the 1,000 hour heat aging period.

Based on the performance of the other compounds evaluated, none gave any significant improvements which would indicate they are desirable as heat stability additives for acrylamide functional compositions.

EXAMPLE 2

An acrylamide functional endblocked polydimethylsiloxane was prepared by the same method as described in Example 1 except that poly(dimethylsiloxane) cyclics having from 3 to 6 dimethylsiloxane units per molecule were used in place of the mixture of poly(dimethylsiloxane) cyclic, poly(methylphenylsiloxane) cyclics and trimethylsiloxy endblocked polydimethylsiloxane. The resulting acrylamide functional endblocked polydimethylsiloxane had a viscosity of 3,489 centipoise and a molecular weight with an $M_w$ of 30,825 and was endblocked with units of the following formula

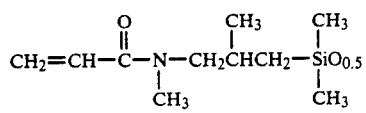

Compositions were prepared and tested as described in Example 1 where Composition 13 was a cold blend of 1 weight percent of (1-hydroxycyclohexyl)phenylmethanone and Composition 14 was a cold blend of 1 weight percent of (1-hydroxycyclohexyl)phenylmethanone and 1 weight percent of tetrabutyl titanate. Composition 13 had an initial Shore OO durometer of 74 and after 1,000 hours, it had a Shore OO durometer of 43, a decrease of 42%. Composition 14 had an initial Shore OO durometer of 72 and after 1,000 hours, it had a Shore OO durometer of 60, a decrease of 17%. This example demonstrates the improvement in heat stability obtained from tetrabutyl titanate in an acrylamide functional polydimethylsiloxane.

COMPARATIVE EXAMPLE

A composition (Composition 1A) was prepared by cold blending an acrylated polyurethane with one weight percent 1-hydroxy-2-methyl-1-phenylpropan-1-one (photoinitiator), and 5 weight percent of dipentaerytritolmonohydroxypentaacrylate. Compositions (Compositions 2A-4A) were prepared by adding 1 weight percent of tetrabutyl titanate, stannous octoate, or zinc naphthenate (additive) as shown in Table IV. A commercially available acrylated urethane was thinned with 20 weight percent 1,6-hexanediol diacrylate and one weight percent 1-hydroxy-2-methyl-1-phenylpropan-1-one (Composition 1B) and compositions were prepared by adding the same photoinitiator and additives in the same concentration (Compositions 2B-4B). The compositions were cured and tested as described in Example 1 with the results obtained as shown in Table V.

TABLE IV

| COMPOSITION | ADDITIVE |
|---|---|
| 1A | NONE |
| 2A | TETRABUTYL TITANATE |
| 3A | STANNOUS OCTOATE |
| 4A | ZINC NAPHTHENATE |
| 1B | NONE |
| 2B | TETRABUTYL TITANATE |
| 3B | STANNOUS OCTOATE |
| 4B | ZINC NAPHTHENATE |

TABLE V

| COMPOSITION | INITIAL | SHORE OO, after | | | | | | CHANGE |
|---|---|---|---|---|---|---|---|---|
| | | 1 DAY | 3 DAYS | 7 DAYS | 14 DAYS | 21 DAYS | 42 DAYS | |
| 1A | 95 | 86 | 91 | 90 | 90 | 95 | | GOOEY LIQUID |
| 2A | 90 | 89 | 90 | 89 | 91 | 87 | | GOOEY LIQUID |
| 3A | 90 | 91 | 72 | 70 | 65 | 92 | | GOOEY LIQUID |
| 4A | 90 | 84 | 77 | 70 | 66 | 82 | | GOOEY LIQUID |

TABLE V-continued

| COMPOSITION | INITIAL | SHORE OO, after | | | | | | CHANGE |
|---|---|---|---|---|---|---|---|---|
| | | 1 DAY | 3 DAYS | 7 DAYS | 14 DAYS | 21 DAYS | 42 DAYS | |
| 1B | 84 | 79 | 77 | 80 | 83 | 85 | 80 | −5% |
| 2B | 84 | 81 | 81 | 85 | 85 | 86 | 85 | +1% |
| 3B | 84 | 76 | 80 | 80 | 81 | 86 | 88 | +5% |
| 4B | 86 | 81 | 80 | 84 | 82 | 84 | 86 | 0% |

This example demonstrates that the additives which provide improved heat stability to acrylamide functional polyorganosiloxanes appear to have no effect on the organic acrylates which are cured by ultraviolet radiation. The values as measured by the durometer values were no different when no additive was present than when one of tetrabutyl titanate, stannous octoate, or zinc naphthenate was present.

That which is claimed is:

1. A composition comprising a polydiorganosiloxane having on the average more than about 0.4 acrylamide functional groups per molecule and being crosslinkable by exposure to ultraviolet radiation in the presence of a photosensitization system, an effective amount of a heat stability additive selected from the group consisting of zinc naphthenate, stannous octoate, and tetraorganotitanate, and an effective amount of a photosensitization system.

2. The composition according to claim 1 in which the polydiorganosiloxane is a blend of (A) 4 to 90 mole percent of an acrylamide functional endblocked polydiorganosiloxane of the general formula YR'$_2$SiO(R$_2$SiO)$_n$SiR'$_2$Y, (B) 9 to 50 mole percent of a mono-acrylamide functional endblocked polydiorganosiloxane of the general formula R'$_3$SiO(R$_2$SiO)$_n$SiR'$_2$Y, and (C) 0 to 65 mole percent of a non-functional polydiorganosiloxane of the formula R'$_3$SiO(R$_2$SiO)$_n$SiR'$_3$ where, in the above formulae, R is a monovalent radical selected from the group consisting of alkyl, aryl, and fluorinated alkyl; each R' is independently selected from the group consisting of R, and hydroxyl, Y is an acrylamide functional radical bonded to silicon atom through silicon-carbon bond where the acrylamide function has the formula

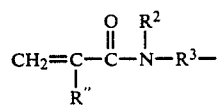

or the formula

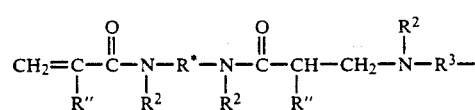

in which R" is a hydrogen atom or methyl, R$^2$ is hydrogen atom or an alkyl of 1 to 4 carbon atoms, R$^3$ is a divalent hydrocarbon radical having from 1 to 10 carbon atoms per radical, R* is a divalent hydrocarbon radical or a divalent hydrocarbon radical containing ether linkages and n has a value of from 30 to 3,000, the mole percentages being based on the total blend as 100 mole percent and where the polydiorganosiloxanes of the blend are present in amounts to provide 20 to 95 percent of the endblocking as acrylamide functionality and 5 to 80 percent of the endblocking as nonfunctional.

3. The composition according to claim 2 in which Y is an acrylamido functional group of the formula

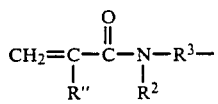

in which R$^3$ is a divalent hydrocarbon radical having from 2 to 6 carbon atoms per radical.

4. The composition according to claim 2 in which the polydiorganosiloxanes of the blend are present in amounts to provide 45 to 80 percent of the endblocking as acryl functionality and 20 to 55 percent of the endblocking as nonacryl functional.

5. The composition according to claim 3 in which the polydiorganosiloxanes of the blend are present in amounts to provide 45 to 80 percent of the endblocking as acryl functionality and 20 to 55 percent of the endblocking as nonacryl functional.

6. The composition according to claim 1 in which the heat stability additive is zinc naphthenate.

7. The composition according to claim 2 in which the heat stability additive is zinc naphthenate.

8. The composition according to claim 3 in which the heat stability additive is zinc naphthenate.

9. The composition according to claim 4 in which the heat stability additive is zinc naphthenate.

10. The composition according to claim 5 in which the heat stability additive is zinc naphthenate.

11. The composition according to claim 10 in which the zinc naphthenate is present in an amount of from 0.005 to 5 weight percent based on the weight of the composition.

12. The composition according to claim 11 in which the zinc naphthenate is present in an amount of from 0.5 to 2 weight percent based on the weight of the composition.

13. The composition according to claim 1 in which the heat stability additive is organotitanate.

14. The composition according to claim 13 in which the organotitanate is tetrabutyltitanate.

15. The composition according to claim 14 in which the tetrabutyl titanate is present in an amount of from 0.7 to 1.5 weight percent based on the weight of the composition.

16. The composition according to claim 2 in which the heat stability additive is organotitanate.

17. The composition according to claim 16 in which the organotitanate is tetrabutyltitanate.

18. The composition according to claim 17 in which the tetrabutyl titanate is present in an amount of from 0.7 to 1.5 weight percent based on the weight of the composition.

19. The composition according to claim 3 in which the heat stability additive is organotitanate.

20. The composition according to claim 19 in which the organotitanate is tetrabutyltitanate.

21. The composition according to claim 20 in which the tetrabutyl titanate is present in an amount of from 0.7 to 1.5 weight percent based on the weight of the composition.

22. The composition according to claim 5 in which the heat stability additive is organotitanate.

23. The composition according to claim 22 in which the organotitanate is tetrabutyltitanate.

24. The composition according to claim 23 in which the tetrabutyl titanate is present in an amount of from 0.7 to 1.5 weight percent based on the weight of the composition.

25. The composition according to claim 1 in which the heat stability additive is stannous octoate.

26. The composition according to claim 2 in which the heat stability additive is stannous octoate.

27. The composition according to claim 3 in which the heat stability additive is stannous octoate.

28. The composition according to claim 5 in which the heat stability additive is stannous octoate.

29. The composition according to claim 3 in which the photosensitization system is (1-hydroxycyclohexyl)-phenylmethanone.

30. The composition according to claim 5 in which the photosensitization system is (1-hydroxycyclohexyl)-phenylmethanone.

31. The composition according to claim 8 in which the photosensitization system is (1-hydroxycyclohexyl)-phenylmethanone.

32. The composition according to claim 10 in which the photosensitization system is (1-hydroxycyclohexyl)-phenylmethanone.

33. The composition according to claim 11 in which the photosensitization system is (1-hydroxycyclohexyl)-phenylmethanone.

34. The composition according to claim 12 in which the photosenitization system is (1-hydroxycyclohexyl)-phenylmethanone.

35. The composition according to claim 21 in which the photosensitization system is (1hydroxycyclohexyl)-phenylmethanone.

36. The composition according to claim 24 in which the photosensitization system is (1-hydroxycyclohexyl)-phenylmethanone.

37. The composition according to claim 27 in which the photosensitization system is (1-hydroxycyclohexyl)-phenylmethanone.

38. The composition according to claim 28 in which the photosensitization system is (1hydroxycyclohexyl)-phenylmethanone.

* * * * *